(12) United States Patent
Langensiepen

(10) Patent No.: US 12,229,624 B2
(45) Date of Patent: Feb. 18, 2025

(54) CONVEYOR ROLLER

(71) Applicant: INTERROLL HOLDING AG, Sant'Antonino (CH)

(72) Inventor: Dominik Langensiepen, Hückelhoven (DE)

(73) Assignee: Interroll Holding AG, Sant'Antonino (CH)

( * ) Notice: Subject to any disclaimer, the term of this patent is extended or adjusted under 35 U.S.C. 154(b) by 0 days.

(21) Appl. No.: 18/559,499

(22) PCT Filed: May 9, 2022

(86) PCT No.: PCT/EP2022/062408
§ 371 (c)(1),
(2) Date: Nov. 7, 2023

(87) PCT Pub. No.: WO2022/238289
PCT Pub. Date: Nov. 17, 2022

(65) Prior Publication Data
US 2024/0242042 A1    Jul. 18, 2024

(30) Foreign Application Priority Data
May 10, 2021  (DE) ............. 10 2021 112 177.9

(51) Int. Cl.
*G06K 7/10* (2006.01)
*B65G 39/02* (2006.01)
*H01Q 1/22* (2006.01)

(52) U.S. Cl.
CPC ......... *G06K 7/10366* (2013.01); *B65G 39/02* (2013.01); *H01Q 1/22* (2013.01); *B65G 2203/046* (2013.01)

(58) Field of Classification Search
CPC ....... G06K 7/10366; B65G 39/02; H01Q 1/22
(Continued)

(56) References Cited

U.S. PATENT DOCUMENTS 11,008,176 B1 * 5/2021 Van Kleef ............ B65G 39/12
11,926,478 B1 * 3/2024 Frangeul ............ B65G 13/071
(Continued)

FOREIGN PATENT DOCUMENTS

DE   10 2010 005 110 A1   7/2011
IT       UB20155386 A1    5/2017
(Continued)

OTHER PUBLICATIONS

International Search Report for PCT/EP2022/062408 mailed Aug. 24, 2022.
(Continued)

*Primary Examiner* — Allyson N Trail
(74) *Attorney, Agent, or Firm* — Wagenknecht IP Law Group PC

(57) ABSTRACT

Conveyor roller (2), comprising a metal tube (21) which is mounted rotatably about an axis of rotation (A) and provides a contact surface (21a) for a conveyed object and/or a conveyor belt on an outer circumferential surface; the conveyor roller (2) comprises a communication arrangement (4), adapted for wireless communication, in particular an NFC arrangement or an RFID arrangement, the communication arrangement (4) in particular adapted to provide information wirelessly to a reader (5) located in the vicinity.

9 Claims, 4 Drawing Sheets

(58) Field of Classification Search
USPC .......................................................... 235/451
See application file for complete search history.

(56) References Cited

U.S. PATENT DOCUMENTS

| | | | |
|---|---|---|---|
| 2009/0194390 A1* | 8/2009 | Freeman | B65G 43/02 198/810.01 |
| 2012/0024669 A1* | 2/2012 | Danelski | B65G 13/02 198/781.05 |
| 2015/0154428 A1* | 6/2015 | Pantaloni | G06K 7/10178 340/10.1 |
| 2016/0340127 A1* | 11/2016 | Ferguson | B65G 15/08 |
| 2018/0251318 A1 | 9/2018 | Taylor et al. | |
| 2019/0325712 A1* | 10/2019 | Nemati | G06Q 20/208 |
| 2020/0256745 A1* | 8/2020 | Baggio | B65G 43/02 |
| 2020/0385934 A1* | 12/2020 | Salciccia | B65G 37/005 |
| 2021/0221457 A1* | 7/2021 | Wen | B60B 29/002 |
| 2021/0353857 A1* | 11/2021 | Ulrich | A61M 5/14244 |
| 2021/0403249 A1* | 12/2021 | Chintalapalli Patta | B65G 47/8815 |
| 2022/0250850 A1* | 8/2022 | Furthmann | F16G 3/06 |
| 2022/0398875 A1* | 12/2022 | Stephens | F01L 9/20 |
| 2023/0278806 A1* | 9/2023 | Fourney | B65G 17/24 198/348 |
| 2023/0338653 A1* | 10/2023 | Rueda | G16H 20/17 |

FOREIGN PATENT DOCUMENTS

| | | |
|---|---|---|
| KR | 10-1225231 B1 | 2/2013 |
| WO | 2016019431 A1 | 2/2011 |
| WO | 2012/057680 A1 | 5/2012 |
| WO | 2015/042661 A2 | 4/2015 |
| WO | 2017/020080 A1 | 2/2017 |
| WO | 2018109165 A1 | 12/2017 |
| WO | 2018141009 A1 | 8/2018 |

OTHER PUBLICATIONS

Written Opinion for PCT/EP2022/062408 mailed Aug. 24, 2022.
Unknown, ISO 14443 contactless card standard, Published 2023 at https://www.thalesgroup.com/en/markets/digital-identity-and-security/technology/iso14443#:~: text=ISO%2014443%20is%20a%20standard,can%20never%20exceed%2010%20centimeters, accessed Nov. 7, 2023.
Diesch et al, "Antenna Technology and Propagation of Electromagnetic Waves", https://ap.physik.uni-konstanz.de/PP/PP2010/antennen/bricht_antennen.pdf, accessed May 16, 2023, published Jul. 31, 2010.
European Office Action for EP 22 728 404.9-1017 mailed May 25, 2023.
European Office Action for EP 22 728 404.9-1017 mailed Aug. 10, 2023.

* cited by examiner

CONVEYOR ROLLER

FIELD OF THE INVENTION

The present invention relates to a conveyor roller, in particular a motor-driven conveyor roller.

BACKGROUND OF THE INVENTION

WO 2018/109165 A1 discloses a motor-driven conveyor roller. The conveyor roller comprises a tube, which is usually made of metal. The tube is mounted on a frame so as to be rotatable about an axis of rotation. The metallic components of the conveyor roller or the metallic components in the vicinity of the conveyor roller constitute an electromagnetic shield.

For maintenance purposes, it may be useful to identify the conveyor roller. For example, the construction type or age, versions of the installed software or hardware, an operating manual of the conveyor roller can be determined, from which specific maintenance measures can be derived.

SUMMARY OF THE INVENTION

It is the object of the present invention to provide an easy-to-use possibility for identifying a conveyor roller. The identification of the conveyor roller should be reliable and should not have a disturbing influence on the function of the roller. Preferably, identification should be possible when the conveyor roller is installed in a conveyor arrangement. The identification shall be made possible by a reader that is not part of the control of the conveyor roller or of a higher-level conveyor arrangement.

The object of the present invention is solved by a conveyor roller, a conveyor arrangement and a use, which includes a metal tube mounted rotatably about an axis of rotation and provides a contact surface for a conveyed object and/or a conveyor belt on an outer circumferential surface; and a communication arrangement, adapted for wireless communication, in particular a near field communication (NFC) arrangement or a radio frequency identification (RFID) arrangement, the communication arrangement (4) in particular adapted to provide information wirelessly to a reader located in the vicinity.

The invention proposes to provide the conveyor roller with a communication arrangement. The communication arrangement can provide information to a reader in the vicinity of the conveyor roller. The information to be provided may comprise in particular a unique identification, in particular a serial number; information on the installed software (including firmware); and/or information on the installed hardware.

In one embodiment, the communication arrangement is a passive arrangement. In this case, the communication arrangement does not need its own power supply. The energy required for communication can be provided inductively by the reader during use.

The communication arrangement is in particular a near field communication (NFC) arrangement or a radio frequency identification (RFID) arrangement. In one embodiment, the communication arrangement accordingly comprises in particular an RFID badge or an NFC badge.

In particular, the communication arrangement is adapted to communicate according to the RFID or the NFC standard. In particular, the HF ISO 14443 1-10 cm standard with frequency 14443 is used.

A badge is understood to mean in particular what is also called a "tag" in common parlance.

In particular, a badge comprises a communication chip with a data processing function and an antenna for wireless transmission of data provided by the communication chip.

In particular, the invention is applicable to conveyor rollers with a diameter of max. 60 mm, as the lateral coverage by the longitudinal member is comparatively large in this case. A readout by bringing the reader close to the conveyor groove in the axial direction is prevented.

Drum motors can also be regarded as conveyor rollers, but usually have a diameter of at least 80 mm. In the case of drum motors with large diameters, the lateral shielding by the side member is comparatively small; alternatively, the RFID chip can be integrated in a comparatively large axle stub. In this case, reading by means of the reader can also take place from the side/in the axial direction.

In the context of the present invention, the directional indications such as axial and radial refer to the axis of rotation of the conveyor roller.

The invention enables information from the conveyor roller to be read out despite the shielding components in the conveyor roller or in the vicinity of the conveyor roller when used as intended. The readout can take place when the conveyor roller is installed, in particular when the conveyor roller is in operation.

BRIEF DESCRIPTION OF THE DRAWINGS

The invention is explained in more detail below with reference to the figures; herein shows.

DETAILED DESCRIPTION

Figure 1:
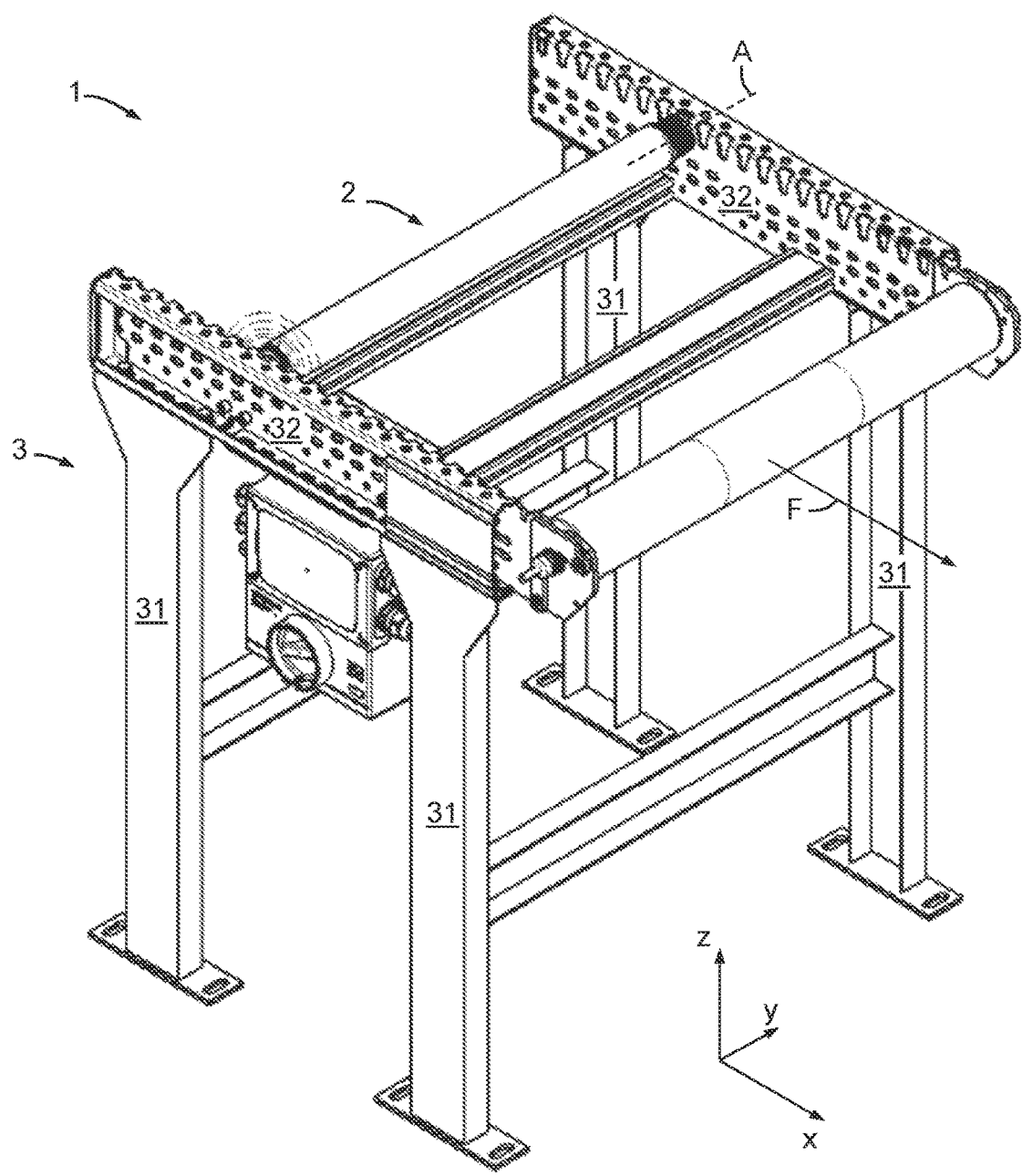
FIG. 1 a schematic representation of a conveyor arrangement according to the invention.

FIG. 1 shows a conveyor arrangement 1 with a conveyor roller 2 according to the invention. The conveyor roller is mounted on a frame 3. The frame has several legs 31 and two longitudinal beams 32 running parallel to each other. The longitudinal beams 31 are aligned parallel to a conveying direction F.

Conveying rollers 2 are arranged transversely to the conveying direction F and between the longitudinal members 32, of which only one conveying roller 2 is shown in FIG. 1. In one embodiment, several conveyor rollers 2 are part of a roller conveyor section. In one embodiment, the conveyor roller according to the invention serves as a support and/or deflection roller for a conveyor belt.

The conveyor rollers 2 are rotatably mounted around an axis of rotation A. The axis of rotation A is aligned transversely to the conveying direction F.

Figure 2:
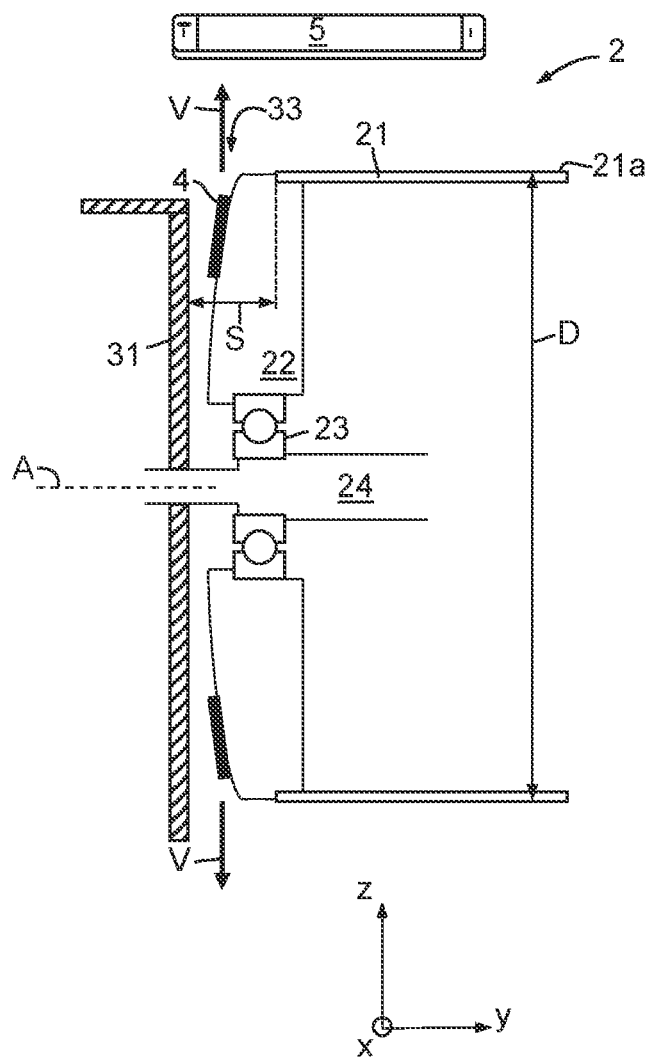
FIG. 2 a cross-section of the conveyor arrangement according to FIG. 1.

FIG. 2 shows a section of the conveyor arrangement in the area of the connection of the conveyor roller to the side member.

The conveyor roller has a metal tube 21 which forms a contact surface 21a for a conveyed object or for a conveyor belt. The metal tube 21 is closed at the axial ends by an end cap 22. The end cap 22 is connected to a fixed shaft 24 via a pivot bearing 23. The shaft may be a stub shaft which does not extend along the entire axial length of the conveyor roller 2. The shaft 24 is attached to the longitudinal member 31. The shaft 24 can have a non-circular cross-section, which makes it possible to create a form-related pivot lock with respect to the longitudinal member 31.

The side member 32 is formed of metal.

Both the longitudinal beam 32 and the metal tube 21 form a shield for electromagnetic signals.

The conveyor roller 2 has a communication arrangement 4. The communication arrangement 4 can be read by means of a reader 5. The communication arrangement 4 can contain information about the conveyor roller 2, in particular such as type designation, serial number, date of manufacture, etc. Alternatively, the communication arrangement 4 can contain an individual link to a database entry, the content of which can be retrieved via the Internet.

The communication arrangement 4 can be read out during the installed state, also during operation, i.e. while the conveyor roller is rotating.

Figure 3:
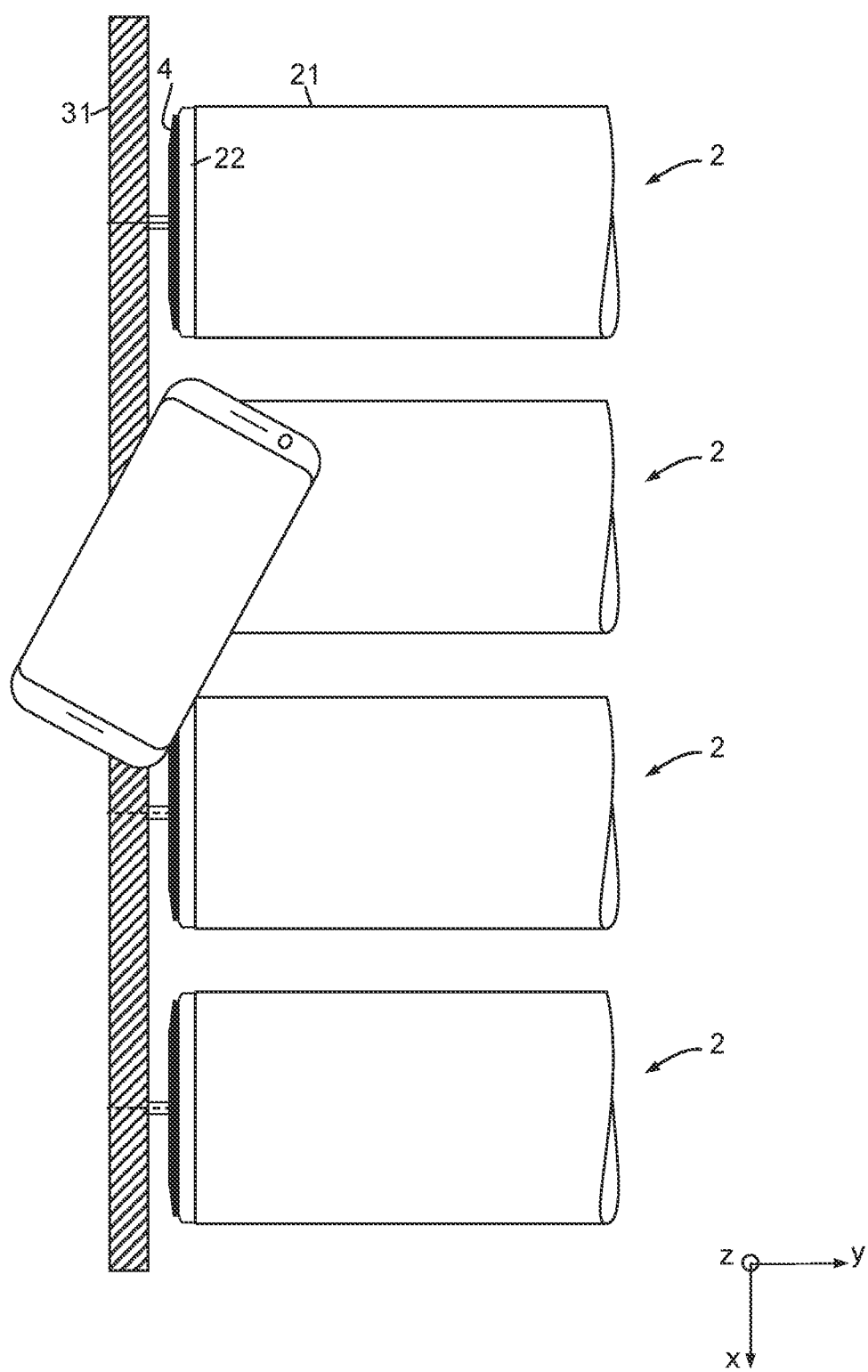
FIG. 3 a section of the conveyor arrangement according to FIG. 1 in plan view with several conveyor rollers.

Viewed from above (FIG. 3), the communication arrangement 4 is arranged in a gap 33 between the metal tube and the longitudinal member 31. A predominant direction of radiation V of the communication arrangement 4, in particular of one or more antennas of the communication arrangement, is radial in relation to the axis of rotation A The communication arrangement 4 consequently uses the undisturbed gap 33 to transmit the data from the conveyor roller 2 to the reader 5.

A predominant direction of radiation V of the communication arrangement or antenna is understood to be in particular a direction in which the communication arrangement, in particular its antenna, provides a higher transmission power than in another direction.

In particular, the transmission power of the communication arrangement is greater in the radial direction than in the axial direction.

In side view, the communication arrangement 4 is arranged completely within a diameter D of the contact surface 21a. The arrangement is thus protected from the conveyed object or the conveyor belt by the metal tube.

Figure 4:
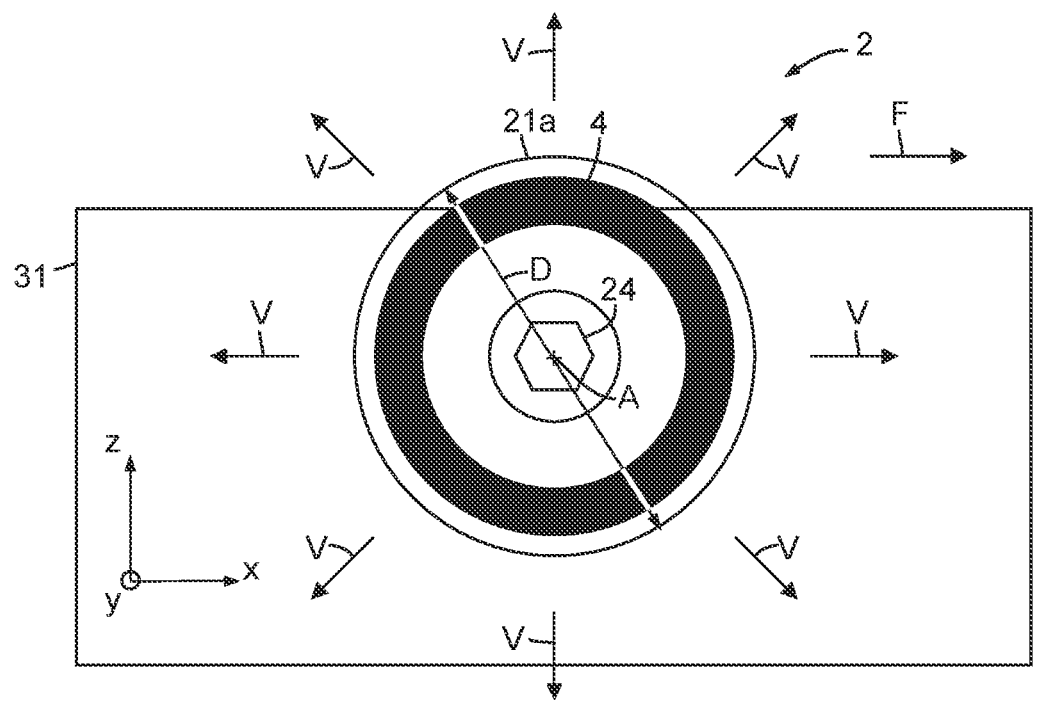
FIG. 4 a side view of the conveyor roller of the conveyor arrangement according to FIG. 1.

The invention is particularly applicable to conveyor rollers with a comparatively small diameter. As FIG. 4 shows, small conveyor rollers are very likely to be completely or largely covered by the shielding side member 31 when viewed from the side.

Figure 5:
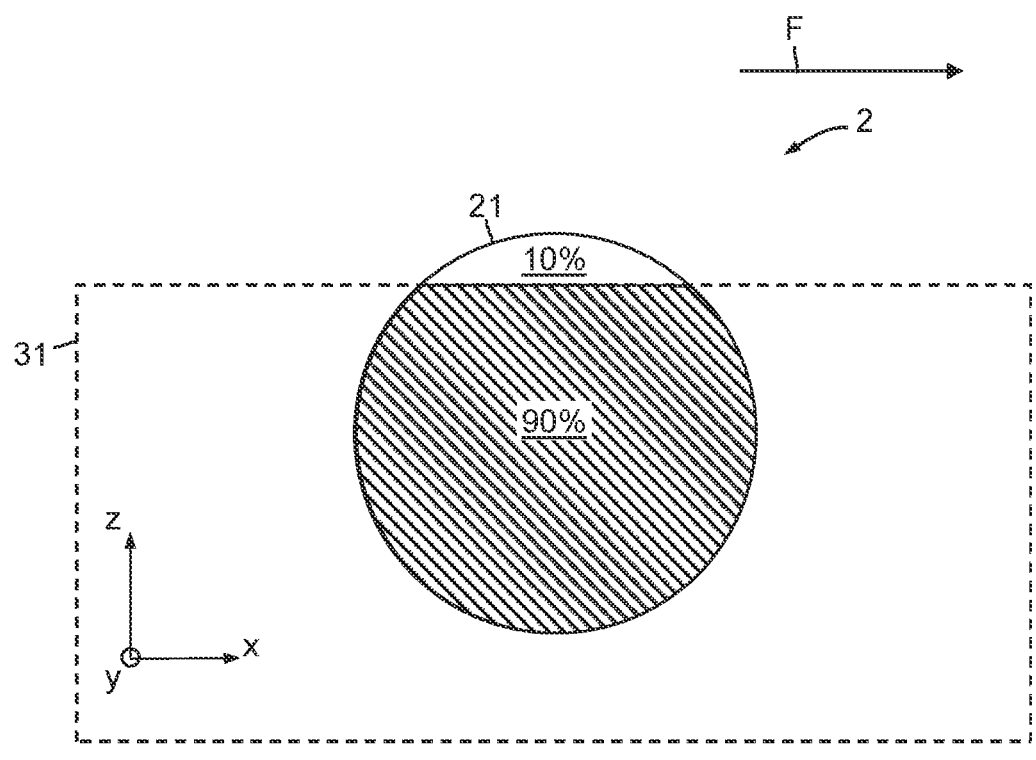
FIG. 5 a schematic view according to FIG. 4 to illustrate the degree of shielding.

FIG. 5 shows what is meant by the degree of lateral shielding. The longitudinal member 31, which covers the roller when viewed from the side, is shown dashed. The area covered by the side member is, for example, 90%, as only 10% of the roller is visible from the side. Consequently, the degree of lateral shielding is 90%. The greater the degree of lateral shielding, the lower the probability that the reader can reliably receive laterally, i.e. axially, emitted data. With such laterally shielded conveyor rollers, the reader cannot simply be held axially laterally next to the conveyor roller to enter into communication with the communication arrangement.

Various possibilities are conceivable to enable radiation in several radial directions.

The antenna of a single communication chip can be designed so that the radiation is quasi omnidirectional.

In another variant, the communication arrangement may have a plurality of individual communication badges, each having a predominant direction of radiation V in one direction, for example, each in one of the arrows V shown in FIG. 4. If the arrangement then has, for example, eight such separate individual communication badges arranged in a circumferentially distributed manner, these can together provide radial radiation all around.

In this way, the communication arrangement can be read out independently of the current rotational position of the conveyor roller.

The communication arrangement 4 can be ring-shaped and arranged coaxially around the shaft.

The communication arrangement 4 may be in the form of a sticker and may be adhered to the end cap 22.

LIST OF REFERENCE SIGNS 1 conveyor arrangement
2 conveyor roller
21 metal tube
21a contact surface
22 end cap
23 Pivot bearing
24 shaft
3 frame
31 stand leg
32 longitudinal member
33 gaps space
4 communication arrangement
Reader (e.g. mobile phone)
A axis of rotation
F direction of conveyance
S width of gap
V predominant transmitting direction
D outer diameter

What is claimed is:

1. A conveyor arrangement (1) for conveying a conveyed object along a conveying direction (F), the conveyor arrangement (1) comprising:
   a frame (3) comprising at least one longitudinal beam (31) which is aligned parallel to the conveying direction (F); and
   at least one conveyor roller (2) fastened to the longitudinal beam (31) transversely to the conveying direction (F), the at least one conveyor roller (2) comprising:
      a metal tube (21) which is mounted rotatably about an axis of rotation (A) and provides a contact surface (21a) for a conveyed object and/or a conveyor belt on an outer circumferential surface; and
      a communication arrangement (4), adapted for wireless communication, in particular a near field communication (NFC) arrangement or a radio frequency identification (RFID) arrangement, the communication arrangement (4) in particular adapted to provide information wirelessly to a reader (5) located in the vicinity; and
   a gap formed axially between the metal tube (21) and the longitudinal member (31); and
   wherein the communication arrangement (4) is arranged on the conveyor arrangement (1) in such a way that a predominant direction of radiation (V) of the communication arrangement (4) is arranged in the gap (33), and is aligned radially to the axis of rotation (A).

2. The conveyor arrangement (1) according to claim 1, wherein in side view, the conveyor roller (2) is shielded by the longitudinal member (31) to a degree of at least 60%, in particular at least 80%, in particular at least 90%, in particular 100%.

3. Use of a conveyor arrangement (1) according to claim 1 for establishing a communication link between a reader (5) and the communication arrangement (4), in particular for reading out the communication arrangement (4), the reader (5) is arranged vertically above the communication arrangement (4).

4. The use of a conveyor arrangement (1) according to claim 3, wherein for reading out the reader (5) is held at a distance of 1 to 10 cm from the communication arrangement (4).

5. The use of a conveyor arrangement (1) according to claim 3, wherein the conveyor roller (2) performs a rotational movement about the axis of rotation (A) during the read-out.

6. The conveyor arrangement (1) according to claim 1, wherein the communication arrangement (4) is attached to an axial end of the conveyor roller, optionally to an end cap (22) which at least partially closes the metal tube (21).

7. The conveyor arrangement (1) according to claim 1, wherein the communication arrangement (4) is arranged axially next to the metal tube (21), in particular arranged in such a way that the metal tube (21) does not radially cover the communication arrangement (4).

8. The conveyor arrangement (1) according claim 1, wherein in side view, the communication arrangement (4) is arranged within an outer diameter (D) of the contact surface (21*a*).

9. The conveyor arrangement (1) according to claim 1, wherein a predominant direction of radiation (V) of the communication arrangement (4), in particular the predominant direction of radiation of an antenna of the communication arrangement (4), is aligned radially to the axis of rotation (A).

* * * * *